United States Patent Office 3,847,981
Patented Nov. 12, 1974

3,847,981
MONOALKYLATION OF UREA
David E. Morris, Kenmore, and Francis R. Smith, Buffalo, N.Y., assignors to Pennwalt Corporation, Philadelphia, Pa.
No Drawing. Filed June 25, 1971, Ser. No. 157,053
Int. Cl. C07c 127/14
U.S. Cl. 260—553 R                                4 Claims

ABSTRACT OF THE DISCLOSURE

An improved process for the preparation of mono-t-alkylated ureas by contacting a mixture of urea and about 1.2–2.0 moles of 70–90% sulfuric acid per mole of urea with about 0.8–1.5 moles of a tertiary mono-olefin per mole of urea at autogenous pressure at about 20–50° C. for at least about two hours.

BACKGROUND OF THE INVENTION

This invention relates to an improved process for the preparation of mono-t-alkylated ureas by the interaction of urea and a tertiary mono-olefin in the presence of sulfuric acid, no additional catalysts or inert diluents being employed to provide a directive effect.

Alkylation of urea with a tertiary olefin in the presence of sulfuric acid is known (U.S. Pats. 2,548,585; 2,822,390; 2,849,485; 2,849,488; 3,280,186; and 3,297,752).

In preparing good yields of primarily di-t-alkylated ureas, agitation, cooling and utilization of the reactants have been found to be inherent process difficulties. Various solutions have been offered. U.S. 2,548,585 proposed the addition of various inert solvents or diluents. U.S. 2,822,390 and 2,849,488 proposed to reduce reaction viscosity by the use of methyl sulfuric acid and $SO_3$ or the use of $SO_2$ as a diluent. U.S. 2,849,485 improved yields of di-t-alkylated ureas by the addition of catalytic amounts of ionic iron salts. U.S. 3,280,186 and 3,297,752 proposed using diluents and various ionic metal salts to produce primarily mono-t-alkylated ureas.

U.S. 3,297,753 discloses procedures for separating mono- and di-t-alkylated ureas.

BRIEF SUMMARY OF THE INVENTION

In a process for preparing N-t-alkyl urea (such as t-butyl urea) by reacting a tertiary mono-olefin (such as isobutylene) and urea in the presence of an acid catalyst, the present invention is directed to the improvement which consists essentially of premixing the urea with about 1.2–2.0 moles of sulfuric acid of 70–90% by weight concentration, per mole of urea, while keeping the temperature below 70° C., and contacting this mixture with agitation with about 0.8–1.5 moles of the olefin per mole of urea at autogenous pressure at a temperature of about 20–50° C. for at least about two hours.

DETAILED DESCRIPTION OF INVENTION

Contrary to previous disclosures, it has now been discovered that essentially mono-t-alkylated ureas can be efficiently prepared in good yield from urea and a tertiary mono-olefin in the presence of sulfuric acid without added catalysts or diluents.

When premixing the urea and sulfuric acid, the temperature should not be allowed to exceed 70° C. since urea may be decomposed by sulfuric acid above this temperature. The temperature is preferably kept 50° C., normally below 40° C., such as by external cooling means.

The sulfuric acid is diluted to about 70–90% concentration by weight in order to facilitate agitation, preferably about 77–85%. About 1.2–2.0 moles per mole of urea are employed, preferably 1.4–1.7 moles.

The olefins are tertiary mono-olefins having the general formula:

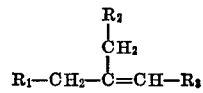

where $R_1$, $R_2$ and $R_3$ are hydrogen or lower alkyl of about 1–6 carbons (preferably 1–4 carbons), and $R_1$ and $R_3$ can form a lower alkylene diradical. Illustrative of such olefins are 2-methyl-1-pentene, 2-methyl-2-butene, 2-methyl-1-butene, 2-methyl-2-pentene, 3-methyl-2-pentene, 2-methyl-1-hexene, 2-methyl-2-hexene, 2,4,4-trimethyl-1-pentene, 2,4,4-trimethyl-1-hexene, 1-methylcyclohexene and isobutylene, the latter being preferred and used to exemplify the process of this invention since it is the most readily available of these olefins.

It is immaterial whether liquid or gaseous olefin, or solid or aqueous solutions of urea are used, providing that the proper stoichiometric relationships are maintained. The t-olefin is added at autogenous pressure, that is, the pressure generated by the olefin itself as it is added under the desired reaction conditions. The pressure for isobutylene generally ranges from 20–40 p.s.i.g. at reaction temperatures of 20–45° C. The rate of addition controls the reaction temperature and pressure. The rate of addition is preferably controlled to provide about 30–35 p.s.i.g. at about 30° C.

The mole ratio of olefin:urea can range from about 0.8 to 1.5, the preferred ratio being about 1–1.3. Less than an 0.8:1 ratio is operative but reduces yields as shown in the examples.

The reaction temperature can range from about 20° to about 50° C., preferably about 20–45° C. Above 50° C., large amounts of polybutene oil by-product may be formed as shown by the examples to follow. The urea and olefin should be allowed to react for at least about two hours with stirring in order to achieve good yields. The time required will be dependent on the efficiency of agitation, the olefin reactant, temperature, mole ratios and the like. Preferably the reaction is allowed to continue for at least 4 or 5 hours following addition, more than about 8 hours seldom being required. Allowing the reaction to continue for greater than 8–10 hours is seldom necessary and may result in unwanted by-products.

The reaction can be effectively terminated by the addition of water. Various means of recovery and separation are known.

EXAMPLES

The following typical procedure, with modification in amounts of reactants, temperatures and pressures as noted, was employed for the examples summarized in Table I.

A mixture of urea and 1.2–2.0 moles (per mole of urea) of $H_2SO_4$ was prepared with efficient cooling keeping the temperature below about 40–50° C.

0.67–1.3 moles (per mole of urea) of isobutylene were added to the above mixture in an autoclave over a period of about ¾ to 2 hours, the temperature being maintained by controlling the rate of addition and/or cooling. When the addition of isobutylene was complete, the pressure rapidly decreased to zero.

Stirring of the reaction mixture was then continued for the specified time at the temperature desired. Reactions were terminated by the addition of about 16% by weight of water based on the weight of the reaction mixture. This allowed for the separation of any polybutene oil which may have formed.

The t-butylurea is then recovered by conventional means of neutralization of the acidic reaction mixture. Depending on the use contemplated, the product can be filtered and dried or use as an aqueous slurry.

The "percent" yield is total yield of alkylated urea based on urea. The percent mono-t-butylurea by assay averaged 80–92% in all examples.

In the table, IB is isobutylene.

Example 11 shows the effect of allowing the reaction temperature to exceed 50° C. by more than a few degrees. While a sample taken after 2.5 hours at 50° C. showed good yield, an additional 2.5 hours at 55–60° C. showed a lower yield and formation of considerable polybutene oil by-product.

Example 16 demonstrates that the reaction should be continued for at least about 2 hours (preferably at least 4 hours), while greater than 6–8 hours is seldom needed to achieve good yields.

Examples 27–30 illustrate the effect on yield of varying the IB:urea molar ratio.

What is claimed is:

1. In a process for the preparation of a N-t-alkyl urea by the reaction of a tertiary mono-olefin and urea in the presence of an acid catalyst, the improvement which consists essentially of:
   (a) premixing said urea with about 1.2–2.0 moles of 70–90% sulfuric acid per mole of urea while maintaining the temperature below 70° C.; and
   (b) contacting with agitation said urea-acid mixture with about 0.8–1.5 moles of said olefin per mole of urea at autogeneous pressure at a temperature of about 20°–50° C. for at least about two hours.

2. Claim 1 wherein said olefin is isobutylene.

3. Claim 2 wherein 1.4–1.7 moles of about 77–85% sulfuric acid per mole of urea is premixed with said urea while maintaining said temperature below about 50° C.

4. Claim 3 wherein said urea-acid mixture is contacted with about 1–1.3 moles of isobutylene per mole of urea at a temperature of about 20–45° C. for at least about four hours.

TABLE I

| Ex. | Mole ratios—reactants ||| In addition || Mixing conditions || Percent yield based on urea |||
|---|---|---|---|---|---|---|---|---|---|---|
| | IB/urea | H₂SO₄/urea | H₂SO₄ percent concentrate | P.s.i.g. | Temp., °C. | Temp., °C. | hours | Percent mono- | percent di- | Polybutene trans/mole of urea |
| 1 | 1.2 | 1.67 | 83 | 20–38 | 30–32 | 29–33 | 17 | 67.5 | 2.5 | 1.3. |
| 2 | 1.2 | 1.67 | 83 | 30–35 | 28–30 | 25–30 | 4.5 | 76.4 | 1.0 | 1.9. |
| 3 | 1.2 | 1.67 | 83 | 30–35 | 22–25 | 25–30 | 5 | 72.0 | 3.0 | |
| 4 | 1.2 | 1.67 | 83 | 30–35 | 25–34 | 35 | 5 | 73.0 | | Trace. |
| 5 | 1.2 | 1.85 | 83 | 30–35 | 26–31 | 38 | 5 | 66.3 | | >22. |
| 6 | 1.2 | 1.67 | 80 | 30 | 26–29 | 40 | 5 | 81.0 | | 5. |
| 7 | 1.2 | 1.67 | 80 | 30–35 | 25–29 | 50–55 | 5 | 60.1 | | >22. |
| 8 | 1.2 | 1.67 | 77 | 40 | 30–35 | 32 | 5 | 51.3 | | None. |
| 9 | 1.2 | 1.67 | 77 | 32–40 | 40 | 40 | 5 | 68.2 | | Do. |
| 10 | 1.2 | 1.67 | 77 | 25–34 | 22–28 | 42–45 | 6 | 68.8 | | Do. |
| 11 | 1.2 | 1.67 | 77 | 30–35 | 26–29 | 50, 55–60 | 2.5–2.5 | 66.0–43.7 | | >35. |
| 12 | 1.2 | 1.67 | 77 | 32 | 36–40 | 45 | 7 | 62.7 | 2.0 | |
| 13 | 1.2 | 1.67 | 77 | 22–40 | 40–42 | 40–42 | 6 | 67.3 | | None. |
| 14 | 1.2 | 1.67 | 77 | 35 | 30 | 40 | 6 | 65.5 | | |
| 15 | 1.2 | 1.67 | 77 | 35 | 30 | 40 | 6 | 65.9 | | |
| 16 | 1.2 | 1.67 | 77 | 28–34 | 23–29 | 40–45 | 0.17 | 26.0 | | |
| | | | | | | | 2 | 53.0 | | |
| | | | | | | | 4 | 67.2 | | |
| | | | | | | | 6 | 70.6 | | |
| | | | | | | | 8 | 68.7 | | |
| 17 | 1.3 | 1.80 | 77 | 25–35 | 22–30 | 40–50 | 5 | 70.4 | | 15. |
| 18 | 1.14 | 1.67 | 83 | 30–35 | 25–30 | 25–28 | 18 | 77.5 | | 7.5. |
| 99 | 1.1 | 1.67 | 83 | 32–34 | 27–29 | 30–32 | 5 | 82.0 | | |
| 20 | 1.1 | 1.67 | 77 | 38 | 39–42 | 42 | 6 | 62.5 | | None. |
| 21 | 1.1 | 1.67 | 77 | 35–38 | 39–42 | 45–50 | 6 | 57.8 | | Trace. |
| 22 | 1.1 | 1.4 | 77 | 38 | 30–38 | 45 | 6.5 | 64.7 | | None. |
| 23 | 1.06 | 1.67 | 83 | 32–34 | 25–30 | 31–33 | 5 | 69.0 | | |
| 24 | 1.0 | 1.73 | 80 | 35–38 | 31–34 | 38–45 | 6 | 63.0 | | |
| 25 | 1.0 | 1.46 | 80 | 38–40 | 28–33 | 38 | 6 | 60.0 | | Trace. |
| 26 | 1.0 | 1.40 | 80 | 35–40 | 29–30 | 28 | 5 | 50.7 | | None. |
| 27 | 0.96 | 1.40 | 77 | 40 | 35 | 45–55 | 5 | 62.0 | | Do. |
| 28 | 0.90 | 1.30 | 77 | 35–40 | 28–35 | 45 | 6 | 55.8 | | |
| 29 | 0.83 | 1.21 | 77 | 34 | 25–30 | 45 | 5 | 51.0 | 2.0 | None. |
| 30 | 0.67 | 1.4 | 77 | 34 | 30 | 45–55 | 6 | 48.5 | | |

References Cited

UNITED STATES PATENTS

| 2,548,585 | 4/1951 | Brown | 260—553 R |
| 3,297,752 | 1/1967 | Rutledge | 260—553 R |

OTHER REFERENCES

Abdinora: Chem. Abstracts, vol. 54, col. 10857c–d (1960).

LEON ZITVER, Primary Examiner

M. W. GLYNN, Assistant Examiner